United States Patent Office 2,806,890
Patented Sept. 17, 1957

2,806,890

RECOVERING TRIMETHYLOLETHANE BY ETHYL ACETATE EXTRACTION

Roy T. Gottesman, Clifton, N. J., assignor to Heyden Newport Chemical Corporation, New York, N. Y., a corporation of Delaware No Drawing. Application May 20, 1954, Serial No. 431,253

3 Claims. (Cl. 260—637)

The present invention relates to a novel method of recovering trimethylolethane of high purity and in high yield from aqueous reaction liquors containing, in addition to trimethylolethane, a number of impurities including metal formate and various compounds produced as a result of side reactions.

Trimethylolethane is produced by the condensation of formaldehyde with propionaldehyde in an aqueous medium containing a strongly alkaline compound. The alkaline compound maintains the reaction mixture alkaline during the course of the reaction and also enters into the reaction. The reaction involved may be indicated as follows:

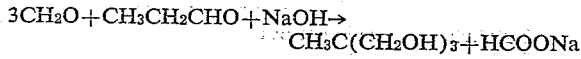

$3CH_2O + CH_3CH_2CHO + NaOH \rightarrow$
$CH_3C(CH_2OH)_3 + HCOONa$

In order to increase the yield based on the amount of propionaldehyde charged, formaldehyde and sodium hydroxide are used in excess of the stoichiometric quantities indicated by the above reaction. Other water soluble alkali metal or alkaline earth compounds may be substituted for the sodium hydroxide. The stronger alkaline compounds are preferred and sodium hydroxide or calcium hydroxide is customarily used. After the reaction is complete and before recovery of the trimethylolethane, the excess sodium hydroxide is preferably neutralized with acid. Formic acid is frequently used for this purpose to convert the sodium hydroxide to sodium formate as its use does not introduce any new type material into the reaction mixture.

Various methods have been proposed for recovering trimethylolethane from the aqueous reaction liquors. The character of these liquors is such that it is very difficult, if not impossible, to precipitate the trimethylolethane in a useable form from the reaction liquor either with or without concentration. The various methods suggested have had numerous drawbacks including being expensive and not producing sufficiently pure trimethylolethane in a high enough yield to be commercially feasible. Particularly for some purposes, such as for use in the manufacture of alkyd resins, esters and drying oils, trimethylolethane must meet quite rigid standards and should be relatively free of metal formate and other impurities which lower the melting point.

In accordance with the present process, the aqueous reaction liquor is evaporated to dryness and the anhydrous dry solid residue is extracted with hot ethyl acetate. The present process has a number of advantages including the fact that the percentage of trimethylolethane recovered is very high and in the neighborhood of, for example, 80%, based on the amount of propionaldehyde used in the reaction. In addition the product is quite pure, being essentially free of metal formate. This high purity apparently results from the use of this particular solvent plus the fact that there is no water present in the dry solid residue. An important aspect is that the trimethylolethane is dissolved from a solid material leaving the impurities as an undissolved residue.

Complete dehydration of the reaction liquor may be carried out in any suitable manner; for example, the reaction liquor may be spray dried or dried on a heated drum. In the following examples drying is effected by adding isopropanol to form an isopropanol-water azeotrope which is removed by distillation.

The extraction of the dry solid residue may be carried out in any suitable manner and, for example, the residue may be agitated with the hot ethyl acetate in a tank and the undissolved metal formate and other impurities are separated by filtration or sedimentation. Alternatively, the hot solvent may be trickled through a bed of the dried residue. In the following examples extractions were carried out in a continuous process by contacting the residue with hot ethyl acetate, withdrawing a portion of the ethyl acetate-trimethylolethane extract, separating part of the ethyl acetate from the withdrawn extract by distillation followed by recycling the separated ethyl acetate back to the tank containing the residue for extracting an additional quantity of trimethylolethane.

The ethyl acetate extraction should be carried out with hot ethyl acetate. It has been found that the solubility of trimethylolethane in ethyl acetate increases as the temperature increases and the temperature of the ethyl acetate preferably should be in the range of 50–77° C. with the optimum temperature being in the range of 70–76° C.

The residue left after extraction with ethyl acetate consists of sodium or calcium formate, which is about 96–98% pure. This insoluble residue can be readily dried and used as a technical grade of material.

*Example I*

Ten parts by weight of an aqueous reaction liquor prepared by condensing formaldehyde with propionaldehyde in water containing sodium hydroxide were mixed with 8.77 parts of isopropyl alcohol. The mixture was evaporated under partial vacuum until there remained only a white solid residue. An additional 4.39 parts of isopropanol were added to the residue and evaporation was continued until there was no further loss of weight, either solvent or azeotrope. The solid white residue which constituted 2.39 parts by weight was ground and then extracted in a continuous fashion with 63 parts by weight of ethyl acetate. The temperature during extraction was maintained in the range of 74–76° C. for a period of three hours.

The material not dissolved by the ethyl acetate was dried and this dried residue which equaled 0.99 part by weight assayed 97.2% sodium formate. This dried undissolved residue is a technical grade of sodium formate and may be used for most purposes without further purification.

The ethyl acetate extract was concentrated under partial vacuum and 49.5 parts of ethyl acetate were removed in this manner. The concentrated solution was cooled to 25° C. and held at this temperature for two hours, during which time the trimethylolethane was separated from the ethyl acetate mother liquor by filtration, washed with 4.5 parts of ethyl acetate and then dried at a temperature of about 98° C. The dried trimethylolethane constituted 1.165 parts by weight and melted at 198–202° C. indicating that the trimethylolethane was quite pure and substantially free of impurities tending to lower the melting point. The yield of trimethylolethane was 82.5% based on the amount of propionaldehyde used in the condensation to produce the reaction liquor. Thus, the purity of the recovered trimethylolethane is not only unusually high, but the yield is appreciably higher than yields obtained using methods proposed in the past.

*Example II*

Ten parts by weight of an aqueous reaction mixture prepared by the alkaline condensation of formaldehyde and propionaldehyde was dried by the azeotrope method described in Example I. The solid white residue which constituted 2.31 parts by weight was ground and then extracted with 63 parts of ethyl acetate. The ethyl acetate was concentrated under partial vacuum and then the trimethylolethane was crystallized, washed and dried, as described in Example I, to produce 1.12 parts of trimethylolethane having a melting point of 198–200° C. The yield of substantially pure trimethylolethane was 80.3% based on the propionaldehyde originally charged in the condensation to produce the reaction liquor. The material in the residue not dissolved by the ethyl acetate constituted 0.86 part by weight and was substantially pure sodium formate.

I claim:

1. The method of recovering trimethylolethane from trimethylolethane-containing aqueous reaction liquors containing impurities including metal formate comprising the steps of removing all of the water from such liquor and producing an anhydrous solid residue containing trimethylolethane, metal formate and other impurities, treating the solid residue with hot ethyl acetate at a temperature in the range of 50–77° C. and dissolving the trimethylolethane from the solid residue in the ethyl acetate and leaving an undissolved formate and impurity remainder, separating the undissolved formate and impurity remainder from the ethyl acetate-trimethylolethane extract, and recovering substantially pure trimethylolethane from the extract.

2. The method of recovering trimethylolethane from trimethylolethane-containing aqueous reaction liquors containing impurities including formate comprising the steps removing all of the water from such liquor and producing an anhydrous solid residue containing trimethylolethane, metal formate and other impurities, treating the solid residue with ethyl acetate at a temperature in the range of 50–77° C. and dissolving the trimethylolethane from the solid residue in the ethyl acetate and leaving an undissolved formate and impurity remainder, separating the undissolved formate and impurity remainder from the ethyl acetate-trimethylolethane extract, and recovering trimethylolethane from the extract by crystallization procedures and separating the crystallized trimethylolethane from the ethyl acetate mother liquor.

3. The method of recovering trimethylolethane from the aqueous reaction liquors containing trimethylolethane, sodium formate and other impurities and produced by condensing formaldehyde and propionaldehyde in an aqueous medium in the presence of sodium hydroxide, the steps comprising removing all of the water from such liquor and producing an anhydrous solid residue containing trimethylolethane, sodium formate and other impurities, treating the solid residue with hot ethyl acetate at a temperature in the range of 70–76° C. and dissolving the trimethylolethane from the solid residue in the ethyl acetate and leaving an undissolved sodium formate and impurity remainder, separating the undissolved formate and impurity remainder from the ethyl acetate-trimethylolethane extract, and recovering trimethylolethane from the extract by crystallization procedures and separating the crystallized trimethylolethane from the ethyl acetate mother liquor.

References Cited in the file of this patent

UNITED STATES PATENTS

| | | |
|---|---|---|
| 2,292,926 | Brubaker et al. | Aug. 11, 1942 |
| 2,347,312 | Cox | Apr. 25, 1944 |
| 2,468,718 | Wyler | Apr. 26, 1949 |